United States Patent [19]
Dutton

[11] 4,269,417
[45] May 26, 1981

[54] SEAL GLAND

[75] Inventor: Walter L. Dutton, Andover, Mass.

[73] Assignee: A. W. Chesterton Company, Stoneham, Mass.

[21] Appl. No.: 48,030

[22] Filed: Jun. 13, 1979

[51] Int. Cl.³ .............................................. F16J 15/00
[52] U.S. Cl. ..................................... 277/11; 277/166; 285/363; 408/72 R
[58] Field of Search ............... 285/363, 405, 368, 412; 408/72 R, 72 B; 277/9, 11, 166

[56] References Cited

U.S. PATENT DOCUMENTS

| 56,326 | 10/1866 | Paterson | 285/363 |
|---|---|---|---|
| 628,835 | 7/1899 | McDonald . | |
| 1,068,148 | 7/1913 | Lyon et al. . | |
| 1,910,890 | 5/1933 | Fortune . | |
| 2,857,142 | 10/1958 | Gertzon | 285/363 |
| 3,909,011 | 9/1975 | Sheesley | 277/11 |

*Primary Examiner*—Robert I. Smith

[57] ABSTRACT

A seal gland comprising an annular seal engaging surface and, radially outward of the surface, a mounting portion comprising one pair of bolt positions comprising radially elongated slots equidistantly spaced about the surface and, equidistantly spaced between said positions of said first pair, a second pair of bolt positions each comprising a plurality of detents radially spaced from each other at predetermined radial positions, whereby bolt holes may be accurately drilled, as required, at a selected one of said detents of each position of said second set.

5 Claims, 3 Drawing Figures

SEAL GLAND

This invention relates to seal glands and more particularly a seal gland adaptable for use with a variety of bolt hole patterns in the machinery with which the seal gland is to be employed.

New seal glands are often required for use with existing machinery, e.g., pumps, when, for example, the machinery is to be retrofitted with a new type seal. Different machines, however, even though having shafts of the same diameter, may have different bolt hole patterns, e.g., the bolt holes may be spaced apart different distances and there may be different numbers of bolt holes, typically either two or four.

It is a principal object of this invention to provide a seal gland which for a given shaft diameter can accommodate different numbers and spacings of bolt holes. It is a further object of this invention to provide such a seal gland which can be accurately modified in the field to accommodate different bolt hole patterns. It is yet a further object of this invention to provide a seal gland having the strength and rigidity required for a mounting configuration of one number of bolts and which is adaptable for use with a greater number of bolts.

In general, the invention features a seal gland comprising an annular seal engaging surface and a mounting portion radially spaced therefrom. Radially spaced from and circumferentially spaced about the seal engaging surface, in the mounting portion, are two sets of bolt positions. The bolt positions of one set each comprise an opening through the mounting portion. The bolt positions of the second set are positioned between pairs of the positions of the first set and each comprise at least one detent at a predetermined radial position. As required, additional bolt holes can therefore be drilled at the second set positions, the radial location being accurately selectable at the detents of said second set positions.

In preferred embodiments, the bolt positions of said first set each comprise radially elongated slots, the bolt positions of said second set each comprise a plurality of radially spaced detents, the bolt positions are equidistantly spaced about the seal engaging surface, the members of first and second set positions are equal, two each in one embodiment, and the mounting portion is radially outward of the seal engaging surface.

Other objects, features and advantages of this invention will be apparent to those skilled in the art from the following detailed description of a preferred embodiment thereof, taken together with the accompanying drawings, in which.

Figure 1:
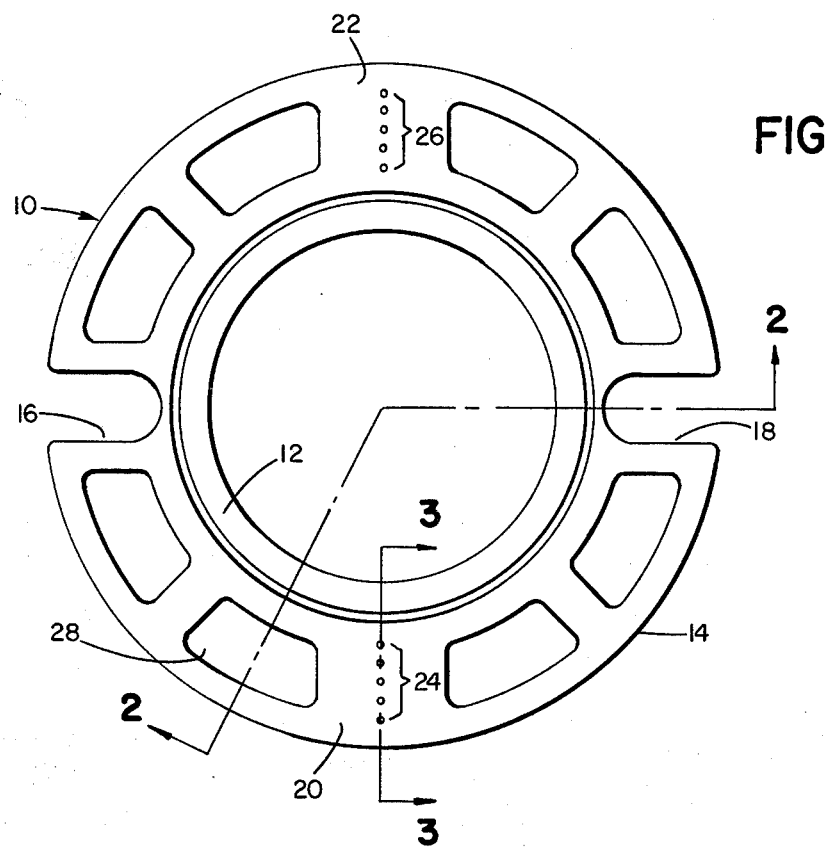
FIG. 1 is a plan view of a seal gland embodying the invention.
Figure 2:
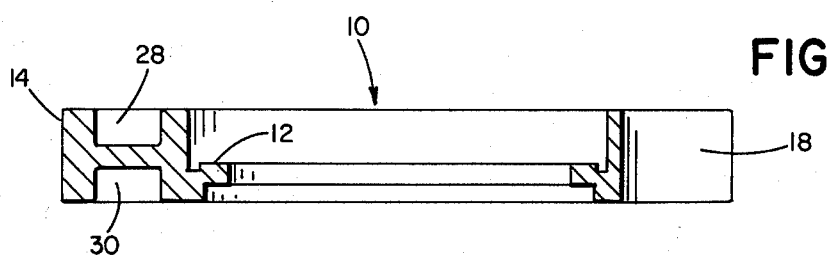
FIG. 2 is a sectional view taken along the line 2—2 of FIG. 1.

Referring now to the drawings, FIGS. 1 and 2 illustrate a seal gland 10 according to a preferred embodiment of the invention. Seal gland 10 comprises a casting in the form of an annulus adapted for mounting on a shaft of predetermined diameter. An annular seal engaging surface 12 defines the inner diameter of seal gland 10. Spaced radially outwardly from surface 12 is the mounting portion 14 of the seal gland 10.

One set of bolt positions in the form of a pair of radially elongated slots 16,18 is provided in the mounting portion 14 on opposite sides thereof extending therethrough. Slots 16,18 are radially spaced from and are equidistantly spaced about the circumference of the seal engaging surface 12. Slots 16,18 are open at the edge of the mounting portion 14.

A second set of bolt positions 20,22 is provided on opposite sides of the mounting portion equidistantly spaced from each other about the circumference of the seal engaging surface 12 and between slots 16,18. The bolt positions 20,22 of the second set each comprise a plurality of radially spaced detents or pilot holes 24,26, best shown in FIG. 3, at predetermined radial positions corresponding to positions of a plurality of standard bolt patterns in machinery with which the seal gland is intended to be utilized.

Figure 3:
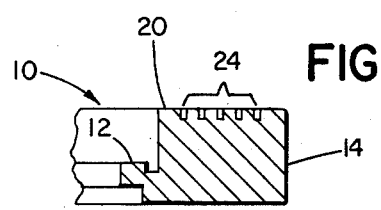
FIG. 3 is a fragmentary sectional view taken along the line 3—3 of FIG. 1.

Recesses 28,30 are formed as shown in FIG. 2 in the mounting portion of the seal gland casting to minimize weight and to conserve material. As best shown in FIGS. 1 and 3, however, the casting is formed at full thickness at the bolt positions 20,22.

Slots 16,18 permit use of the seal gland in a two bolt mounting configuration in which the bolts are to be located in a variety of predetermined positions. Advantageously, because no holes or slots are initially provided at the second set of bolt positions, the seal gland is not weakened thereat which would tend to render the seal gland unsatisfactory for a two bolt mounting configuration. If, on the other hand, a four bolt mounting configuration is required, bolt holes may be drilled in the second bolt positions 20,22 with the exact position of the holes in one of several predetermined positions accurately indicated and guided by detents 24,26. Thus, advantageously, the seal gland may be utilized with shafts of a given diameter for two or four bolt patterns in which the bolts have different radial spacings. The detents or pilot holes permit accurate drilling in the field of bolt holes for a four bolt mounting configuration.

Other embodiments of this invention will occur to those skilled in the art which are within the scope of the following claims.

What is claimed is:

1. A seal gland comprising an annular seal engaging surface and a mounting portion, radially spaced from said surface, comprising one set of bolt positions radially spaced from and circumferentially spaced about said surface, said bolt positions of said one set each comprising a radially elongated slot, characterized in that said mounting portion further comprises a second set of bolt positions radially spaced from and circumferentially spaced about said surface, said bolt positions of said second set positioned between pairs of said positions of said first set and said bolt positions of said second set each comprising a plurality of detents radially spaced from each other at predetermined radial positions.

2. The seal gland claimed in claim 1 further characterized in that said bolt positions are equidistantly spaced about said surface.

3. The seal gland claimed in claim 2 further characterized in that the number of said bolt positions of said second set is equal to the number of said bolt positions of said first set.

4. The seal gland claimed in claim 3 further characterized in that said first and second sets of bolt positions each comprise a pair thereof.

5. The seal gland claimed in any one of the preceding claims further characterized in that said mounting portion is positioned radially outward of said surface.

* * * * *